United States Patent [19]
Mueller

[11] 3,782,514
[45] Jan. 1, 1974

[54] HYDROKINETIC DEVICE

[75] Inventor: Helmut Mueller, Heidenheim/Brenz, Germany

[73] Assignee: Voith Getriebe KG, Heidenheim, Germany

[22] Filed: Feb. 23, 1973

[21] Appl. No.: 335,122

[30] Foreign Application Priority Data
Feb. 25, 1972 Germany.................. P 22 08 857.9

[52] U.S. Cl..................... 188/296, 60/363, 60/364, 60/366
[51] Int. Cl............................................. F16d 57/02
[58] Field of Search........................ 188/296, 290; 60/344, 348, 363, 364, 366

[56] References Cited
UNITED STATES PATENTS
3,072,222  1/1963  Kugel et al..................... 188/296
3,481,148  12/1969  Muller et al. ..................... 188/296
3,512,616  5/1970  Bessiere .............................. 188/296

FOREIGN PATENTS OR APPLICATIONS
15,695  1911  Great Britain...................... 188/296

*Primary Examiner*—Edgar W. Geoghegan
*Attorney*—Michael S. Striker

[57] ABSTRACT

A housing is provided with two coaxial toroidal chambers which are axially adjacent one another. A stator wheel is accommodated in each of the chambers, and a rotor wheel is also accommodated in each chamber. The wheels, which are respectively symmetrically arranged, are provided with blades extending circumferentially and all inclined in the same direction. A working-fluid passage communicates with each chamber and each such passage has a one-way valve interposed in it. A common outlet duct for the working fluid communicates with both of the chambers. A connecting passage communicates the cores of the chambers with one another.

8 Claims, 3 Drawing Figures

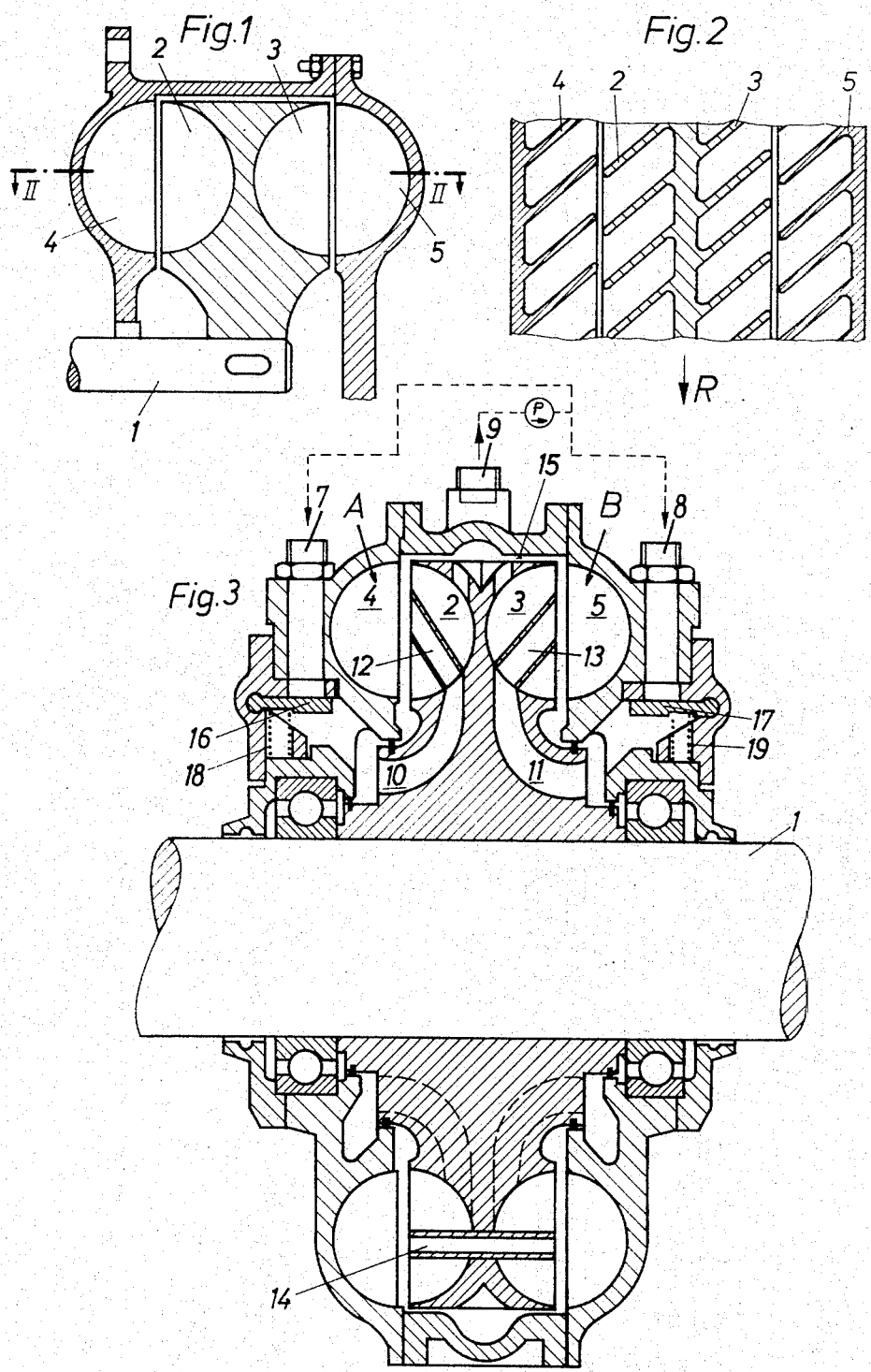

3,782,514

HYDROKINETIC DEVICE

BACKGROUND OF THE INVENTION

The present invention relates generally to a hydrokinetic device, and more particularly to a hydrokinetic device which is especially suitable for use as a fluid brake.

In my prior U.S. Pat. No. 3,481,148 I have disclosed a hydrokinetic device of the type in question, that is a fluid-flow machine which is especially suitable as a fluid coupling as a fluid brake. The machine there disclosed may have a pair of primary and a pair of secondary wheels, that is rotors and stators, provided with blades which are inclined on them in one or in opposite directions, and which are accommodated in toroidal chambers.

If the just-mentioned device is used as a fluid brake, then it can be employed with particular advantage as a brake of railway rolling stock, although its application is by no means limited thereto. However, this is one field of application in which this type of brake has been extensively tested and has been found highly advantageous. The brakes of this type are capable of producing a relatively high braking force while requiring relatively little space which is usually at a premium in such applications.

On the other hand, this type of brake has certain drawbacks. The requirements which must be met to be able to fill the brake with braking fluid are relatively extensive, necessitating the provision of a pump which supplies braking fluid under high pressure and a correspondingly large-dimensioned and powerful motor for driving the pump. Both of these units are relatively large, due to the requirements made of them, and therefore need a substantial amount of space over the above that which is required by the braking device itself. In addition, these powerful pump and motor units are of course rather expensive. Naturally this is to be considered a drawback, especially in the context of a railway vehicle where space for the installation of such components is usually strictly limited. In addition, the supply of electrical energy in railway vehicles, especially in the case of freight cars, is not usually able to meet the high and sudden current requirements which occur when the brake must operate.

SUMMARY OF THE INVENTION

It is, accordingly, an object of the present invention to overcome the aforementioned disadvantages.

More particularly it is an object of the present invention to provide a hydrokinetic device which is especially suitable as a fluid brake and which avoids the aforementioned drawbacks.

Still more particularly, it is an object of the invention to provide such an improved hydrokinetic device which requires less effort to charge the brake with braking fluid, so that the energy requirements for effecting such charging will be correspondingly decreased.

A concomitant object of the invention is to provide such a device which, due to its lesser charging-energy requirements, can operate fully satisfactorily with a charging pump and associated drive motor that can be significantly smaller than what is known heretofore.

An additional object of the invention is to provide such a device which in many applications can even operate without a charging pump and motor therefor.

In keeping with these objects, and with others which will become apparent hereafter, one feature of the invention resides in a hydrokinetic device, particularly a fluid brake which briefly stated comprises a housing having two axially adjacent toroidal chambers, and a pair of symmetrically disposed stator wheels in the respective chambers, as well as a pair of similarly disposed rotor wheels which are also in the respective chambers and which each cooperate with the associated stator wheel. A plurality of blades is provided on each of the wheels and all blades are inclined in the same direction. A separate working-fluid inlet passage communicates with each of the chambers and a one-way valve is interposed in these inlet passages. A common outlet duct is provided for the working fluid, and communicates with both of the chambers. Finally, a connecting passage communicates the cores of the chambers with one another.

A hydrokinetic device constructed in this manner overcomes the disadvantages of the prior art. It is based on the realization that the high power requirements of the charging pump in the prior-art devices are caused by the arrangement of the blades on the wheels, resulting in the application of the braking force substantially in only one of the two working chambers. For ease of identification these working chambers will hereafter be identified as an "active" working chamber and an "inactive" working chamber, meaning that while the braking force is applied by the wheels in the "active" braking chamber the wheels in the "inactive" braking chamber contribute little if anything to the braking force.

In operation of the device according to the prior art the pressure at the other circumference of the "active" working chamber will be substantially higher than the "inactive" working chamber. Also, it appears that this high pressure is propagated from the outer circumference of the "active" working chamber via a cylindrical gap between the housing and the rotor wheel, and then via the "inactive" working chamber to the braking fluid supply duct which is common to both of the working chambers. This means that the charging pump must actually operate against a higher head (greater back pressure) than if both of the working chambers were uniformly "active." Such operation is, however, not possible with the prior-art device.

On the other hand, the hydrokinetic device according to the present invention assures that the charging pump must supply fluid only against a very low head. There is no more pressure propagation from the "inactive" working chamber into the supply duct for incoming braking fluid. This means that the charging pump must supply braking fluid only against the very low head which is built up in that one of the separate supply ducts which communicates with the working chamber that is "active" at the particular time. It will be appreciated that a chamber which is "active" in one operation may be "inactive" in another operation of the brake. In certain circumstances, for example if the rotor is constructed with a supply duct disposed radially inwardly of its annulus of blades and configurated in the same manner as the ducts of impellers of self-priming radial pumps, the pressure of the head may actually drop below atmospheric pressure so that in such applications a charging pump with the associated motor can be completely omitted. In this case the brake rotor itself performs the function of the pump, and of course such construction is still smaller and still less expensive.

However, in order for the device according to the present invention to operate in the desired manner and to overcome the disadvantages of the prior art, it is necessary to assure that the working fluid in that working chamber which is "inactive" at any given time, and which is blocked off by the one-way valve, will nevertheless be able to circulate so that it can become discharged and cooled. It is for this purpose that the connecting passage communicating the cores of the chambers with one another has been provided. Thus, working fluid which has been heated in the chamber which is "inactive" at a given operation, can transfer into the "active" working chamber and may leave the brake from there via the common discharge duct. It is important, incidentally, that the connecting passage communicate not just anywhere with the chambers but with the cores thereof, because it is only in the core of the "active" working chamber that the pressure is sufficiently low to permit working fluid to flow from the "inactive" into the "active" working chamber.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawing.

BRIEF DESCRIPTION OF THE DRAWING

FIG. 1 is a fragmentary axial section through a device according to the present invention;

FIG. 2 shows the blades of the device of FIG. 1 in a partially developed cylindrical section taken on line II—II in FIG. 1; and FIG. 3 is a complete axial section through the device of FIG. 1.

DESCRIPTION OF THE PREFERRED EMBODIMENTS

Discussing now the drawing in detail, which will be seen to illustrate a single exemplary embodiment of the novel device in FIGS. 1-3, it should be noted that the brake has a housing through which there extends a shaft 1 which is rotatable and which is to be decelerated by the operation of the novel device. The housing is provided with two working chambers A and B which are of toroidal configuration. The chamber A accommodates a bladed rotor wheel 2 and a bladed stator wheel 4, and the chamber B accommodates a bladed rotor wheel 3 and a bladed stator wheel 5. The blades of all the wheels are set at an angle with respect to the axis of rotation of the respective wheels, and FIG. 2 shows that they also are all inclined in one and the same direction.

Both of the chambers A and B communicate with a common fluid discharge duct 9 through which the braking fluid is discharged from the chambers. Each of the chambers A and B is, however, provided with a separate working-fluid inlet passage which in the case of chamber A is identified with reference numeral 7 and in the case of chamber B with reference numeral 8. The rotor wheels 2, 3 which in the illustrated embodiment—in which they are symmetrically located between the outer stator wheels 4, 5—can be unitary with one another, are also provided with two rows of respective supply passages 10 and 11. In the illustrated embodiment these passages 10 and 11 are constructed in the manner of impeller ducts of radial pumps, so as to provide self-priming action. Because of the provision of the ducts 10 and 11 and of the manner in which they are constructed, the illustrated embodiment does not require a pump for supplying working fluid thereto, although a pump can be utilized, especially in other embodiments as will be discussed later. The passages 10 and 11 are continued within the rotor wheels 2 and 3 by pipes 12 and 13, respectively, which extend to the core of the respective working chamber A and B. The term "core" is here intended to include the portion of the respective chambers through which a plane normal to their axis of rotation extends, if such a plane is a plane of symmetry. In other words, the core includes the portion of each chamber intermediate the respective rotor and stator wheel therein. These cores are in communication with one another by a plurality (only one shown) of connecting passages 14 (see the lower portion of FIG. 3) so as to permit the flow of fluid from that working chamber which is the "inactive" working chamber at a particular time into that working chamber which at the same time is the "active" working chamber. In addition, the working chambers communicate via a cylindrical gap 15 located in the radial outer zone of the device.

Each of the working-fluid inlet passages 7 and 8 is provided within the device itself with a one-way valve 16 and 17, respectively, which each has associated with it a restoring spring 18 or 19. The valves 16 and 17 permit the flow of braking fluid into the device from the non-illustrated exterior source (which may merely be a reservoir if the construction is as illustrated in the drawing, or which may be a pump drawing from a reservoir); they prevent the expulsion of such fluid from the device back into the passages 7 and 8.

When the rotor wheels of the illustrated device rotate in the direction of the arrow R (see FIG. 2) then the working chamber A is the "active" working chamber whereas the chamber B is the "inactive" working chamber. The brake force produced in the chamber A is greater by several decades than that produced in the "inactive" working chamber B. With the construction illustrated in the exemplary embodiment, the active working chamber (here the chamber A) together with its associated passages 10 has a suction effect on the brake fluid. The fluid pressure which is built up in the chamber A, particularly in the region of its outer circumference, is propagated via the gap 15 into the inactive working chamber, here the chamber B, so that the brake fluid (which may be oil) would overcome the head of pressure in the inlet passage 8 and leave the device via this passage, were it not for the provision of the one-way valve 17 which prevents this. Evidently, if the rotor wheels rotate in the direction opposite to the arrow R shown in FIG. 2, the conditions are reversed, and it is the chamber B which is the active working chamber, whereas the chamber A is the inactive working chamber. In this case the pressure would be communicated from the chamber B into the chamber A and would tend to expel working fluid through the inlet passage 7 thereof, except that this is prevented by the one-way valve 16.

Due to the suction effect provided by the passages 10 and 11 (that is whichever passages are associated with the chamber which is at the moment the "active" working chamber), a charging pump is not normally required with the illustrated embodiment. However, if the passages 10 or 11 were omitted or constructed in a different manner, or if it is for any reason desired to provide such a pump, then its pressure side or outlet can be connected with the inlet passages 7, 8, as illustrated diagrammatically in FIG. 3.

It remains to be pointed out that the outlet duct 9, which is common to both chambers A and B, communicates advantageously with a heat-exchanger wherein the braking heat which has built up in the braking fluid is dissipated. Evidently, such heat-exchangers are well known and therefore need not be illustrated or described. From the heat-exchanger the working fluid is recirculated into the brake, via the pump if one is provided, or directly (e.g., via a reservoir, if there is no pump).

It will be understood that each of the elements described above, or two or more together, may also find a useful application in other types of constructions differing from the types described above.

While the invention has been illustrated and described as embodied in a fluid brake, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is intended as new and desired to be protected by Letters Patent is set forth in the appended claims.

I claim:

1. A hydrokinetic device, particularly a fluid brake, comprising a housing having two axially adjacent toroidal chambers; a pair of symmetrically disposed stator wheels in the respective chambers, and a pair of similarly symmetrically disposed rotor wheels also in the respective chambers and each cooperating with the associated stator wheel; a plurality of blades on each of said wheels and all inclined in the same direction; a separate working-fluid inlet passage communicating with each of said chambers; a one-way valve in each of said inlet passages; a common outlet duct for working fluid communicating with both of said chambers; and at least one connecting passage communicating the cores of said chambers with one another.

2. A device as defined in claim 1; and further comprising a shaft extending through said housing coaxially with said chambers.

3. A device as defined in claim 1; and further comprising working-fluid supply passages for said rotor wheels and arranged radially inwardly of the blades thereof.

4. A device as defined in claim 1, wherein said rotor wheels are located axially intermediate said stator wheels.

5. A device as defined in claim 1, wherein said chambers are coaxial with one another.

6. A device as defined in claim 1, wherein said chambers have identical diameters.

7. A device as defined in claim 1, wherein said blades are arranged in form of annuli, each provided on one of said wheels.

8. A device as defined in claim 1; and further comprising a pump having a discharge side connected with said inlet passage for supplying working fluid thereto.

* * * * *